United States Patent [19]

Kasakevich et al.

[11] Patent Number: 5,104,733

[45] Date of Patent: Apr. 14, 1992

[54] ADHESIVE FOR ADHERING POLYBUTYLENE TO METAL

[75] Inventors: Mark L. Kasakevich; Jennifer L. Engle; David J. St. Clair, all of Houston, Tex.

[73] Assignee: Shell Oil Company, Houston, Tex.

[21] Appl. No.: 483,696

[22] Filed: Feb. 23, 1990

[51] Int. Cl.$^5$ ............................................. B32B 15/08
[52] U.S. Cl. .................................... 428/332; 428/457; 428/461
[58] Field of Search ......................... 428/461, 457, 332

[56] References Cited

U.S. PATENT DOCUMENTS

| | | | |
|---|---|---|---|
| 3,113,986 | 12/1963 | Breslow et al. | 585/266 |
| 3,197,452 | 7/1965 | Natta et al. | 526/159 |
| 3,251,905 | 5/1966 | Zelinski | 525/272 |
| 3,390,207 | 6/1968 | Moss et al. | 525/271 |
| 3,598,887 | 8/1971 | Darcy et al. | 525/271 |
| 3,607,977 | 9/1971 | Taylor et al. | 525/89 |
| 3,970,911 | 7/1976 | Reiche et al. | 219/124.02 |
| 4,000,341 | 12/1976 | Matson . | |
| 4,058,647 | 11/1977 | Inoue et al. | 428/461 |
| 4,198,327 | 4/1980 | Matsumoto et al. | 428/523 |
| 4,219,627 | 8/1980 | Halasa et al. | 525/89 |
| 4,226,952 | 10/1980 | Halasa et al. | 525/192 |
| 4,292,414 | 9/1981 | Saito et al. | 525/255 |
| 4,332,858 | 6/1982 | Saitoh et al. | 428/517 |
| 4,341,837 | 7/1982 | Katsuto et al. | 428/521 |
| 4,427,828 | 1/1984 | Hergenrother et al. | 525/66 |
| 4,578,429 | 3/1986 | Gergen et al. | 525/291 |
| 4,588,648 | 5/1986 | Krueger et al. | 428/516 |
| 4,628,072 | 12/1986 | Shiraki et al. | 525/66 |
| 4,657,970 | 4/1987 | Shiraki et al. | 525/66 |
| 4,657,971 | 4/1987 | Shiraki et al. | 525/66 |
| 4,670,173 | 6/1987 | Hiyashi et al. | 525/285 |

FOREIGN PATENT DOCUMENTS

| | | |
|---|---|---|
| 0169987 | 2/1986 | European Pat. Off. . |
| 58-13242 | 1/1983 | Japan . |
| 6507546 | 6/1965 | Netherlands . |

Primary Examiner—Thomas J. Herbert, Jr.
Attorney, Agent, or Firm—James O. Okorafor

[57] ABSTRACT

A laminated structure comprising a polybutylene layer and a metal layer bonded together with an adhesive composition comprising an acid functionalized selectively hydrogenated block copolymer having at least one block which is predominantly a monoalkenyl aromatic hydrocarbon polymer block and at least one block which is a hydrogenated conjugated diolefin polymer block.

12 Claims, No Drawings

ADHESIVE FOR ADHERING POLYBUTYLENE TO METAL

BACKGROUND OF THE INVENTION

1. Field of the Invention

This invention relates to a laminated structure. More particularly, this invention relates to a laminated structure comprising a metal-polybutylene structure with a functionalized block copolymer tie layer.

2. Prior Art

Laminated structures comprising a plurality of polymeric layers are, of course, well known in the prior art. Such structures are taught in U.S. Pat. Nos. 4,058,647; 4,198,327; 4,332,858; 4,341,837 and 4,588,648 and in Japanese Patent Application No. Sho 58[1983]-13242. U.S. Pat. Nos. 4,332,858 and 4,341,837 teach that various polymeric materials including olefin homopolymers, olefin copolymers such as ethylene and vinyl alcohol, polycarbonates and the like may be adhered with a modified, but unhydrogenated, block copolymer such as a maleated block copolymer of styrene and butadiene. U.S. Pat. No. 4,588,648 teaches that certain polymeric materials such as polypropylene and ethylene/vinyl alcohol copolymers may be laminated with an adhesive layer comprising a grafted copolymer of an olefin and maleic anhydride and an ungrafted polypropylene. However, none of these references describe or suggest a method for bonding polybutylene to metal.

Adhesive and similar compositions which may, at least, comprise a hydrogenated block copolymer containing at least one monoalkenyl aromatic hydrocarbon block and at least one conjugated diolefin block, are, of course, known in the prior art. Polymeric compositions which may contain a hydrogenated block copolymer are taught, for example, in U.S. Pat. Nos. 3,607,977 and 3,970,711 and in European Patent Application No. 0169987. U.S. Pat. No. 3,607,977 teaches compositions comprising a block copolymer containing at least two monoalkenyl aromatic hydrocarbon polymer block and a block copolymer comprising at least one monoalkenyl aromatic hydrocarbon polymer block and at least 10% of the initial unsaturation is reacted so as to incorporate a polar group. The block copolymers may, independently, be neat or hydrogenated. The polar group may be an oxygen containing group such as a carboxyl group. Compositions comprising an oxygen containing group are said to be especially useful as adhesives, particularly for polar textile such as cellulose. However, there is no indication that these adhesives would be useful for the preparation of polymer laminates comprising metal and polybutylene layers. The problem of bonding polybutylene to metal substrates has been a problem for many years. There is therefore a need for laminated structures, comprising a metal and polybutylene.

SUMMARY OF THE INVENTION

It has now been discovered that polybutylene may be bonded to metal substrates with an adhesive comprising a functionalized hydrogenated styrene-olefinic block copolymer. It is, therefore, an object of the present invention to provide an improved method for use in the preparation of metal-polybutylene laminates. The foregoing and other objects and advantages will become apparent from the description set forth hereinafter.

In accordance with the present invention, the foregoing and other objects and advantages are accomplished by a laminated structure comprising a metal layer and a polybutylene layer and an adhesive comprising at least one functionalized selectively hydrogenated block copolymer having at least one block comprised primarily of a monoalkenyl aromatic hydrocarbon monomer and at least one block comprised predominantly of a hydrogenated conjugated diolefin monomer.

DETAILED DESCRIPTION OF THE INVENTION

The present invention relates to a laminated structure comprising a metal layer and a polybutylene layer and an adhesive comprising at least one functionalized selectively hydrogenated block copolymer having at least one block comprised primarily of a monoalkenyl aromatic hydrocarbon monomer and at least one block comprised predominantly of a hydrogenated conjugated diolefin monomer.

The adhesive component of the invention is a modified block copolymer which has been partially hydrogenated and further modified by the grafting of a maleic acid compound onto the block copolymer structure. The term "block copolymer" is used to indicate a thermoplastic elastomer characterized by at least one block of at least predominantly polymerized vinyl aromatic hydrocarbon (A block) and at least one aliphatic block of at least predominantly polymerized conjugated alkadiene (B block).

The vinyl aromatic hydrocarbon useful as the precursor of A blocks has a vinyl group, i.e., a

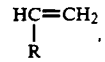

group, attached directly to an aromatic ring and has up to 12 carbon atoms inclusive. Preferred vinyl aromatic hydrocarbons are styrene and styrene homologs such as those of the formula

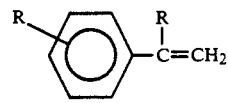

wherein R independently is hydrogen or alkyl of up to 4 carbon atoms inclusive. Illustrative of such compounds are styrene, alpha-methylstyrene, alpha-ethylstyrene, p-methylstyrene, p-ethylstyrene, m-propylstyrene, and alpha,4-dimethylstyrene. Styrene and alpha-methylstyrene constitute a preferred class of vinyl aromatic hydrocarbons and particularly preferred is styrene.

The A blocks of the block copolymer independently are at least predominantly the polymerized vinyl aromatic hydrocarbon and preferably are homopolymeric blocks. Alternatively, however, one or more A blocks are blocks wherein some of the monomer of the B block is copolymerized with the predominant vinyl aromatic hydrocarbon monomer of block A. Such blocks are termed tapered and have at least about 85% by mol and preferably at least 93% by mol of the polymerized vinyl aromatic hydrocarbon with any remainder being the conjugated alkadiene of block B. A blocks containing a mixture of vinyl aromatic hydrocarbons are also suitable but are less preferred. The average molecular weight of an A block is typically from about 5,000 to about 125,000 while A blocks of an average molecular weight from about 7,000 to about 125,000 are preferred.

Each B block independently is at least predominantly polymerized conjugated alkadiene. The alkadienes useful as the monomer for a B Block are conjugated alkadienes of up to 8 carbon atoms inclusive such as those conjugated dienes of the formula

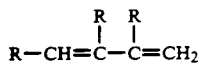

wherein R has the previously stated significance. Illustrative of such alkadienes are butadiene, isoprene, 2,3-dimethylbutadiene, 1,3-octadiene, 1,3-pentadiene and 2-methyl-1,3-hexadiene. Preferred conjugated alkadienes are butadiene and isoprene and butadiene is particularly preferred. Each B block is at least predominantly polymerized alkadiene with the B block being at least about 85% mol and preferably at least about 93% mol of polymerized alkadiene with any remainder being the vinyl aromatic hydrocarbon of the A blocks in the case of a tapered block. Homopolymeric blocks as each B block are preferred although tapered blocks and blocks of polymerized mixed alkadienes are also satisfactory. Within a polymerized alkadiene block two modes of polymerization are possible and are generally observed. In what is termed a 1,4 polymerization, each carbon atom of the four-carbon alkadiene moiety is incorporated within the polymer chain which then includes two carbon atoms joined by an ethylenic linkage. In what is termed 1,2 polymerization, the polymerization involves only one carbon-carbon double bond of the conjugated alkadiene. The carbon atoms of that bond will be incorporated into the polymer chain which will then contain a pendant unsaturated group. Control of the two modes of polymerization is within the skill of the art. Preferred block copolymers are those wherein from about 25% to about 55% of the units of each B block are the result of 1,2-polymerization. The average molecular weight of a B block is suitably from about 10,000 to about 300,000, preferably from about 30,000 to about 150,000.

Within the block copolymer, the A block will total from about 2% by weight to about 55% by weight based on total block copolymer. Content of A block from about 10% by weight to about 30% by weight, same basis, are preferred. The total molecular weight of the block copolymer will average from about 25,000 to about 350,000, preferably from about 35,000 to about 300,000. These average molecular weights are determined by conventional techniques such as tritium counting methods or osmotic pressure measurements.

The structure of the block copolymer will depend upon the method of polymerization employed to produce the block copolymer. In one modification, the block copolymer is termed linear and is produced by sequential polymerization of the blocks. By way of example in producing three-block or triblock polymer, the vinyl aromatic hydrocarbon of the A block is polymerized through the use of an initiator, preferably an alkyl lithium compound. The conjugated alkadiene of block B is then introduced and subsequently the vinyl hydrocarbon required for the second A block. Such a block copolymer is characterized as ABA. A two-block or diblock polymer is produced by polymerizing an A block using a lithium initiator and subsequently introducing the conjugated alkadiene of the second block.

Such a polymer would be characterized as an AB. Substantially complete polymerization of the monomer of each block prior to introducing the monomer of the next block will result in the formation of homopolymeric block. If, prior to the complete polymerization of any one block, the monomer of the next block is introduced a tapered block will result. Similar sequential polymerization techniques are employed to produce block copolymers characterized as ABABA, ABAB, ABABABA, or even polymers of a higher number of blocks. Production of block copolymers, particularly those of a relatively high number of blocks, is also accomplished through the use of a coupling agent such as dihaloalkane will result in the production of linear polymers but use of a coupling agent having a functionality of three or more, e.g., silicon tetrahalides or dialkyl esters of dicarboxylic acids, will result in the formation of polymers which are termed radial or branched, respectively.

These block copolymers are well known in the art and the characterization and production of such polymers are illustrated by U.S. Pat. No. 3,251,905; U.S. Pat. No. 3,390,207; U.S. Pat. No. 3,598,887 and U.S. Pat. No. 4,219,627.

The block copolymers useful as precursors of the blend component of the invention are preferably linear polymers of the following types: polystyrene-polybutadiene (SB), polystyrene-polyisoprene (SI), polystyrene-polybutadiene-polystyrene (SBS), polystyrene-polyisoprene-polystyrene (SIS), poly(alpha-methylstyrene-polybutadiene-poly(alpha-methylstyrene), and poly(alpha-methylstyrene)-polyisoprene-poly(alpha-methylstyrene). Block copolymers of the SBS type are particularly preferred. These block copolymers are now conventional and a number are commercially available and marketed by Shell Chemical Company as KRATON® Thermoplastic Rubber.

To produce the blend component of the invention, the block copolymers are partially hydrogenated and then modified further by reaction with a maleic acid compound. The hydrogenation of block copolymers is also well known in the art and includes catalytic hydrogenation in the presence of Raney nickel or elemental noble metal in finely divided form, e.g., finely divided platinum or palladium. Such hydrogenation typically results in the hydrogenation of most if not all of the unsaturation of the aromatic unsaturation in the A blocks as well as the ethylenic unsaturation of the aromatic unsaturation in the A blocks as well as the ethylenic unsaturation of aliphatic B block. In the production of the components of the blends of the invention, a partial hydrogenation is employed which serves to hydrogenate most of the unsaturation of each aliphatic B block while not hydrogenating the unsaturation of the aromatic rings of the A blocks to any substantial extent. The process of hydrogenation is illustrated by the disclosures of U.S. Pat. No. 3,113,986 and U.S. Pat. No. 4,226,952. Suitable partially hydrogenated block copolymers are those wherein no more than 25% and preferably no more than 5% of the aromatic unsaturation has been hydrogenated and in the hydrogenated polymerized conjugated alkadiene block the residual unsaturation is from about 0.1% to about 20% of the unsaturation prior to hydrogenation.

The partially hydrogenated block copolymer is often identified by the structure of the block copolymer precursor and the "apparent" structure of the alphatic block(s). Thus, partial hydrogenation of an SBS block polymer will result in a polymer having a hydrogenated mid-block produced by 1,4-polymerization and ethylene/butylene copolymer in the case of a mid-block unit produced with a portion of 1,2-polymerization and a portion of 1,4-polymerization. These are indicated by SES and SEBS respectively. A corresponding diblock polymer would be termed SE or SEB. The polymer produced by partial hydrogenation of a SIS block copolymer of a high degree of 1,4-structure in the midblock is termed, upon hydrogenation, a SEPS polymer because of the similarity of the mid-block to an ethylene/propylene copolymer. The maleated, partially hydrogenated block copolymers, preferred as components of the blends of the invention, are preferably made from partially hydrogenated block polymers of the SEBS type wherein the hydrogenated butadiene units of the mid-block are from about 45% to about 65% of the ethylene type (1,4 addition) and the remainder being of the butylene type (1,2 addition). The partially hydrogenated block copolymers of these types are also well known in the art with a number being commercial. For example, certain of the partially hydrogenated block copolymers are marketed by Shell Chemical Company as KRATON ® G Thermoplastic Rubber.

The maleated, partially hydrogenated block copolymer employed as a component in the blends of the invention is an adduct of the partially hydrogenated block copolymer and a maleic acid compound. The maleated polymers are illustratively produced by the addition of a hydrogen atom located on a carbon atom allylic to residual unsaturation of the partially hydrogenated block copolymer to the carbon-carbon double bond of the maleic acid compound together with the formation of a carbon-carbon bond between the maleic acid compound and the polymer chain of the partially hydrogenated block copolymer. By way of illustration, but without wishing to be bound by any particular reaction theory, the production of maleated block copolymer takes place according to the reaction scheme which follows, wherein the wavy lines represent the continuing polymer chain

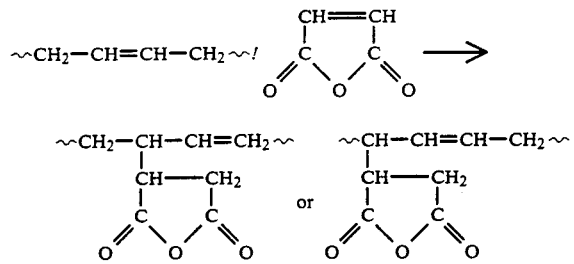

Maleic acid compounds which are suitably employed in the production of the maleated, partially hydrogenated block copolymers include maleic acid, maleic anhydride, mono-alkylesters of maleic acid wherein the alkyl is lower alkyl of up to 4 carbon atoms inclusive, the mono-amide of maleic acid and maleic imide. Of the maleic acid compounds, the use of maleic anhydride is preferred.

The maleated, partially hydrogenated block copolymers are known in the art as is the method of their production. In general, the process for the production of the maleated product is a graft process wherein the maleic acid compound is grafted onto the aliphatic portion of the partially hydrogenated block copolymer chain. In one modification, the partially hydrogenated block copolymer and the maleic acid compound are contacted in the presence of a free radical initiator which is preferably a peroxy compound. Contacting customarily takes place at a temperature sufficient to melt the reactants and to decompose the initiator, for example a temperature from about 75° C. to about 450° C., more often from about 200° C. to about 300° C. Such reactions are often conducted without a solvent or reaction diluent and often in an extruder which serves to melt and mix the reactants and to heat the mixture to the desired elevated temperature. In alternate modifications, the partially hydrogenated block copolymer and the maleic acid compound are contacted in solution in a suitable solvent in the absence of a free radical initiator at an elevated temperature on the order of from about 150° C. to about 200° C. Often, free radical inhibitors are added in these latter modifications to inhibit gelling.

The extent of the maleation of the partially hydrogenated block copolymer is dependent in part on the extent of residual unsaturation of the polymer aliphatic block(s). In terms of the polymers as described above, sufficient maleic acid compound is reacted with the partially hydrogenated block copolymer to produce a maleated derivative containing from about 0.02% by weight to about 20% by weight, based on total polymer, of the moiety derived from the maleic acid compound grafted onto the aliphatic portion of the partially hydrogenated block copolymer. Preferably the maleated product will contain from about 0.1% by weight to about 10% by weight of the maleic acid moiety on the same basis, and most preferably from about 0.2% by weight to about 5% by weight of the maleic acid compound moiety.

In general, the solvent-free "extruder-type" maleation process is preferred. Disclosures of such processes, now conventional, are found in U.S. Pat. No. 4,292,414; U.S. Pat. No. 4,427,828; U.S. Pat. No. 4,628,072; U.S. Pat. No. 4,657,970 and U.S. Pat. No. 4,657,971. Other processes are disclosed in U.S. Pat. No. 4,578,429 and U.S. Pat. No. 4,670,173.

Certain of the maleated, partially hydrogenated block copolymers are commercial and some are marketed by Shell Chemical Company as KRATON ® G Thermoplastic Rubber. A particularly preferred maleated, partially hydrogenated block copolymer is marketed as KRATON ® FG 1901X Thermoplastic Rubber and is characterized as a maleated block copolymer of the SEBS type with a styrene content of 28% by weight, a specific gravity of 0.91 and a maleic acid functionality, as grafted maleic anhydride, of 2% by weight.

The polybutylene which is a basic component of the laminates of this invention is a product of such a stereospecific polymerization procedure and is referred to as an "isotactic" or "stereospecific" polymer in that the repeating units of its polymeric chain all possess the same stereochemical configuration along the chain. This is to be contrasted with "atactic" polymers wherein the repeating units of the polymeric chain vary in a random configuration along the chain. The stereochemical nature of the isotactic polybutylene for use in the present invention may be readily observed from the following structural depiction thereof:

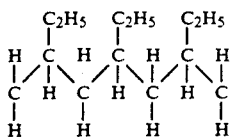

The high molecular weight, isotactic polybutylenes utilized in the novel structures of this invention are prepared by the stereospecific polymerization of monomeric butene-1. Methods for conducting such polymerization procedures are well known to those skilled in the art; typical procedures being disclosed in U.S. Pat. No. 3,197,452, issued July 27, 1965, and in Dutch application No. 6507546, published Dec. 16, 1965. These procedures generally involve the use of polymerization initiators or catalysts for the polymerization of the monomeric butene-1 to polymers of high molecular weight. Among the preferable catalytic systems utilized in such procedures are the reaction products of metal alkyl compounds, such as aluminum triethyl, and a heavy metal compound, such as the trihalides of Groups IV–VI metals in the Periodic Table, e.g. titanium, vanadium, chromium, zirconium, molybdenum and tungsten, etc. The formation of polymers exhibiting substantial isotactic properties as well as the variations in the molecular weight thereof will thus depend on the nature of the polymerization catalyst, the nature of the co-reactants in the system and the reaction conditions being utilized, etc.

The applicable isotactic polybutylenes are relatively rigid while in their plastic form but flow readily upon being heated. As noted, they must exhibit a high molecular weight. Thus, expressing molecular weight in terms of "melt flow," the applicable isotactic polybutylenes should exhibit a melt flow in the range of from 0.2 to 300, and preferably from 0.4 to 40.0. The latter melt flow values are determined by the method described in ASTM D 1236-62 Te and are inversely related to molecular weight, i.e. the lower the melt flow value, the higher the molecular weight. In addition, it should be noted that minor amounts, i.e. up to about 5% by weight, of alpha-olefin comonomers, such as ethylene and propylene, may be present in the butene-1 polymerization system without any substantial loss of the herein-described desirable properties displayed by the resultant essentially homopolymeric system.

Therefore, the term polybutylene may refer to polymers of butene-1 homopolymer and butene-1 copolymers such as butene-1-ethylene, butene-1-propylene, and butene-1-alpha olefins having from 5 to 8 carbon atoms.

Butene-1 can be copolymerized with a variety of alpha-olefins to provide useful copolymers such as those taught in U.S. Pat. No. 3,362,940 which is herein incorporated by reference.

In general, any of the processes known in the prior art to be useful for the preparation of a laminated structure may be used to produce the laminated structure of this invention. Suitable fabricating methods, then, include coextrusion processes wherein the separate layers of polybutylene and adhesive are separately extruded and then laminated together as they pass through a multilayer die and concurrently or subsequently bonded to metal e.g. metal foil or preformed structure; processes wherein the adhesive layer is previously formed into a film or sheet, then placed between a preformed polybutylene layer and a metal substrate and heated and pressed by means of a hot pressure or the like to bond the adhesive film to the polybutylene layer and the metal; hot lamination processes wherein the adhesive composition of this invention is melted and then coated onto one or more polymeric structures, which polymeric structures are then pressed onto metal films or structures and cooled; solvent lamination processes wherein the adhesive composition of this invention is dissolved in a solvent, coated on the polymeric or metal structures to be laminated, the solvent evaporated and the laminate then heated and pressed to effect the desired bonding; and wet lamination processes wherein the adhesive composition of this invention is used as a latex to bond the several layers of a laminated structure. Of these several processes, coextrusion is preferred since the adhesive composition of this invention exhibits a relatively broad operating temperature range thereby permitting the necessary flow adjustments through variations in temperature needed to permit the formation of a uniform laminated structure.

The laminated structures of this invention may be used in any of the applications known in the prior art for such laminates. Suitable uses, then, include packaging films in the form of films and sheets or for any application where it is desirable to adhere polybutylene to metal.

PREFERRED EMBODIMENT OF THE INVENTION

In a preferred embodiment of the present invention, the adhesive composition will comprise at least one functionalized block copolymer comprising at least one block of styrene and at least one block of butadiene or isoprene containing from about 0.1 to about 2.5 wt. % maleic acid units. In the preferred embodiment, the block copolymer will be selectively hydrogenated such that at least about 98% of the ethylenic unsaturation initially contained therein is converted (saturated). In the preferred embodiment, the block copolymer contained in the adhesive composition will contain from about 90 to about 65 wt. % either butadiene or isoprene. Also in a preferred embodiment of the present invention, the adhesive composition will be used to form a laminate comprising one metal layer and one layer of polybutylene. In the preferred embodiment, the laminate will be coextruded such that the adhesive composition of this invention forms a tie layer between the metal layer and the polybutylene.

A blend of block copolymers can be used, said blend having better rheological properties for coextruding than at least most block copolymers when used singly. In this embodiment, the block copolymer blend will comprise from about 20 to about 97 wt. % of at least one triblock copolymer having polystyrene end blocks and a central hydrogenated polybutadiene or hydrogenated polyisoprene block and from about 80 to about 3 wt. % of at least one diblock copolymer having a single polystyrene block and a single hydrogenated polybutadiene or hydrogenated polyisoprene block. The weight average molecular weight of the polystyrene blocks in the triblock and diblock copolymers will be within the range from about 4,000 to about 15,000. The weight average molecular weight of the hydrogenated conjugated diolefin blocks in both polymers will be within the range from about 10,000 to about 100,000.

The adhesive layer may be applied at any thickness which will be functional. Preferred thicknesses are between 0.001 inch and 0.050 inch. The thickness may vary widely, especially where the metal substrate has a non-uniform surface or shape.

Having thus broadly described the present invention and a preferred and most preferred embodiment thereof, it is believed that the invention will become even more apparent by reference to the following examples. It will be appreciated, however, that the examples are presented solely for purposes of illustration and should not be construed as limiting the invention.

EXAMPLES

Peel tests were conducted for steel/maleated styrene-hydrogenated butadiene-styrene block copolymer/-polybutylene/maleated styrene-hydrogenated butadiene-styrene block copolymer/steel structures. The peel tests were conducted at room temperature in accordance with procedures outlined in ASTM D 903. Adhesive film thicknesses of 0.001 inch and 0.005 inch were tested along with heat seal times of 5, 10, and 15 seconds and sealing temperatures of 245° C. and 260° C.

The adhesive used in the Examples was KRATON ® FG 1901X Rubber available from Shell Chemical Company. The adhesive was solvent cast onto 1 inch by 6 inch steel strips 0.003 inch thick.

The 0.001 inch thick coating of adhesive was applied to steel cleaned with isopropyl alcohol using a solution of 20 wt. % KRATON ® FG 1901X Rubber in toluene. The applied coating dried to form an adhesive 0.001–0.0015 inches thick. The 0.005 inch coating of adhesive was applied using a solution of 25 wt. % solids in toluene. A 0.030 inch thick application dried to form a coating of 0.005–0.006 inches thick.

Laminated structures were formed using a 0.030 inch thick sheet of polybutylene DP 2420, available from Shell Chemical Company, pressed between two adhesive coated strips of steel. The structures were pressed for 5, 10, or 15 seconds at a temperature of 245° C. or 260° C. at a pressure of 40 Psi.

The laminate structures were peeled according to ASTM D903 at room temperature and the load at maximum was recorded.

Laminate structures of steel-polybutylene-steel containing no adhesive were made under the above conditions. The layers did not adhere and no peel strength test values could be obtained.

TABLE I

| | Peel Strength, Pounds Per Linear Inch | | |
|---|---|---|---|
| | 5 SECONDS | 10 SECONDS | 15 SECONDS |
| 0.001 inch - 245° C. | | | |
| | 2.9 | 6.1 | 10.9 |
| | 1.3 | 5.2 | 8.2 |
| | 2.4 | 4.5 | 11.8 |
| | 2.3 | 4.1 | 15.0 |
| | 1.5 | 6.2 | 8.7 |
| Mean | 2.1 | 5.2 | 10.9 |
| Standard Deviation | .6 | .9 | 2.7 |
| 0.001 inch - 260° C. | | | |
| | 10.6 | 6.6 | 6.6 |
| | 11.4 | 10.1 | 6.9 |
| | 6.2 | 7.7 | 6.4 |
| | 8.1 | 9.1 | 6.1 |
| | 5.4 | 5.7 | 7.8 |
| Mean | 8.3 | 7.8 | 6.8 |
| Standard Deviation | 2.7 | 1.8 | 0.6 |
| 0.005 inch - 254° C. | | | |
| | 10.6 | 11.5 | 17.4 |

TABLE I-continued

| | Peel Strength, Pounds Per Linear Inch | | |
|---|---|---|---|
| | 5 SECONDS | 10 SECONDS | 15 SECONDS |
| | 8.5 | 12.9 | 13.2 |
| | 13.6 | 10.9 | 13.1 |
| | 11.3 | 14.7 | 13.7 |
| | 10.6 | 19.7 | 11.0 |
| Mean | 10.9 | 13.9 | 13.7 |
| Standard Deviation | 1.8 | 3.5 | 2.3 |
| 0.005 inch - 260° C. | | | |
| | 10.3 | 12.7 | 11.5 |
| | 9.4 | 12.8 | 13.0 |
| | 13.8 | 14.7 | 16.0 |
| | 14.5 | 16.6 | 12.0 |
| | 15.3 | 18.3 | 11.8 |
| Mean | 12.7 | 15.0 | 12.9 |
| Standard Deviation | 2.6 | 2.4 | 1.9 |

The data are summarized in Table II.

TABLE II

| | Peel Strength, Pounds Per Linear Inch | | |
|---|---|---|---|
| | 5 SECONDS | 10 SECONDS | 15 SECONDS |
| 0.001 inch - 245° C. | 2.1 (.6) | 5.2 (.9) | 10.9 (2.7) |
| 0.001 inch - 260° C. | 8.3 (2.7) | 7.8 (1.8) | 6.8 (.6) |
| 0.005 inch - 245° C. | 10.9 (1.8) | 13.9 (3.5) | 13.7 (2.3) |
| 0.005 inch - 260° C. | 12.7 (2.6) | 15.0 (2.4) | 12.9 (1.9) |

*All of the values in the above table are the mean. The numbers in parenthesis are the standard deviations.

Another group of samples were aged for two weeks and the tests repeated. The results are given in Table III.

TABLE III

| | Peel Strength, Pounds Per Linear Inch Samples Aged Two Weeks | | |
|---|---|---|---|
| | 5 SECONDS | 10 SECONDS | 15 SECONDS |
| 0.001 inch - 245° C. | | | |
| | .95 | 5.3 | 7.3 |
| | 1.9 | 6.7 | 3.4 |
| | 1.7 | 2.8 | 6.4 |
| | 5.2 | 3.5 | 3.1 |
| | 2.7 | 5.8 | 5.6 |
| Mean: | 2.7 | 4.8 | 5.2 |
| Standard Deviation: | 1.6 | 1.6 | 1.9 |
| 0.001 inch - 260° C. | | | |
| | 3.5 | 5.4 | 4.9 |
| | 2.1 | 7.2 | 5.6 |
| | 1.9 | 6.2 | 5.7 |
| | 1.8 | 6.3 | 6.5 |
| | 2.8 | 5.9 | 5.5 |
| Mean: | 2.4 | 6.2 | 5.7 |
| Standard Deviation: | .7 | .7 | .6 |
| 0.005 inch - 245° C. | | | |
| | 8.1 | 6.9 | 12.0 |
| | 9.3 | 10.0 | 9.8 |
| | 12.1 | 13.0 | 10.2 |
| | 9.1 | 10.5 | 12.5 |
| | 9.7 | 10.0 | 9.1 |
| Mean: | 9.7 | 10.1 | 10.7 |
| Standard Deviation | 1.5 | 2.2 | 1.5 |
| 0.005 inch - 260° C. | | | |
| | 10.5 | 10.3 | 9.0 |
| | 13.6 | 6.8 | 9.4 |
| | 9.0 | 10.5 | 12.1 |

TABLE III-continued

| | Peel Strength, Pounds Per Linear Inch Samples Aged Two Weeks | | |
|---|---|---|---|
| | 5 SECONDS | 10 SECONDS | 15 SECONDS |
| | 11.1 | 8.2 | 8.4 |
| | — | 12.8 | 9.4 |
| Mean: | 11.0 | 9.7 | 9.7 |
| Standard Deviation: | 2.0 | 2.3 | 1.4 |

The data are summarized in Table IV.

TABLE IV

| | Peel Strength, Pounds Per Linear Inch Samples Aged Two Weeks | | |
|---|---|---|---|
| | 5 SECONDS | 10 SECONDS | 15 SECONDS |
| 0.001 inch - 245° C. | 2.5 (1.6) | 4.8 (1.6) | 5.2 (1.9) |
| 0.001 inch - 260° C. | 2.4 (.7) | 6.2 (.7) | 5.7 (.6) |
| 0.005 inch - 245° C. | 9.7 (1.5) | 10.1 (2.2) | 10.7 (1.5) |
| 0.005 inch - 260° C. | 11.0 (2.0) | 9.7 (2.3) | 9.7 (1.4) |

*All of the values in the above table are the mean. The numbers in parenthesis are the standard deviations.

It can be seen from Table I and II that peel strengths of up to 15 pounds per linear inch can be obtained in a steel-polybutylene-steel laminate by using a maleated block copolymer tie layer or adhesive. Tables III and IV show that laminate structures which were aged for two weeks still exhibited good peel strengths of up to 11 pounds. Without the adhesive there was no measurable adhesion between the layers.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

What is claimed is:

1. A laminated structure comprising at least one metal and at least one polybutylene layers and an adhesive layer between the metal and polybutylene layers, said adhesive consisting essentially of a hydrogenated block copolymer having at least one block comprised primarily of a monoalkenyl aromatic hydrocarbon monomer and at least one block comprised predominantly of a hydrogenated conjugated diolefin monomer, said block copolymer which is further modified by reacting with a maleic acid compound.

2. The laminated structure of claim 1 wherein said functionalized block copolymer is acid modified.

3. The laminated structure of claim 1 wherein said maleic acid compound is maleic anhydride.

4. The laminated structure of claim 1 wherein the metal is steel.

5. The laminated structure of claim 1 wherein the metal is aluminum.

6. The laminated structure of claim 1 wherein the block copolymer is a styrene-hydrogenated butadiene-styrene block copolymer.

7. The laminated structure of claim 1 wherein the block copolymer is styrene-hydrogenated isoprene-styrene block copolymer.

8. The laminated structure of claim 1 wherein said adhesive layer is between 0.0001 inch to about 0.10 inch thick.

9. The laminated structure of claim 1 prepared via coextrusion.

10. The laminated structure of claim 1 wherein said adhesive is a blend containing a hydrogenated triblock copolymer, said triblock copolymer which is further modified by reacting with a maleic acid compound and a hydrogenated diblock copolymer, said diblock copolymer which is further modified by reacting with a maleic acid compound.

11. The laminated structure of claim 1 wherein said polybutylene has a melt flow of between 0.2 and 300.

12. The laminated structure of claim 1 wherein the polybutylene is isotactic polybutylene.

* * * * *